US009497789B1

(12) United States Patent
Kosireddy et al.

(10) Patent No.: US 9,497,789 B1
(45) Date of Patent: Nov. 15, 2016

(54) METHODS, APPARATUS, AND DEVICE FOR WIRELESSLY CONNECTING A PLURALITY OF DEVICES FOR COMMUNICATION IN A NETWORK

(71) Applicant: Marvell International Ltd., Hamilton (BM)

(72) Inventors: Sunitha Reddy Kosireddy, Saratoga, CA (US); Neeta Srivastav, Los Gatos, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/558,487

(22) Filed: Dec. 2, 2014

Related U.S. Application Data

(60) Provisional application No. 61/911,713, filed on Dec. 4, 2013.

(51) Int. Cl.
*H04W 76/02* (2009.01)
*H04W 8/00* (2009.01)
*H04J 13/00* (2011.01)

(52) U.S. Cl.
CPC ............ *H04W 76/023* (2013.01); *H04J 13/00* (2013.01); *H04W 8/005* (2013.01)

(58) Field of Classification Search
USPC ........................................................ 370/342
See application file for complete search history.

(56) References Cited

U.S. PATENT DOCUMENTS

| | | | | |
|---|---|---|---|---|
| 2005/0153714 A1* | 7/2005 | Subrahmanya | ....... | H04W 68/00 455/458 |
| 2005/0277429 A1* | 12/2005 | Laroia | ................ | H04W 68/025 455/458 |
| 2006/0133269 A1* | 6/2006 | Prakash | ................ | H04W 68/00 370/229 |
| 2008/0182595 A1* | 7/2008 | Willey | ................ | H04W 68/025 455/458 |
| 2009/0098890 A1* | 4/2009 | Vasudevan | ............ | H04W 68/06 455/458 |
| 2012/0178485 A1* | 7/2012 | Zeira | ....................... | H04W 4/08 455/515 |
| 2013/0100867 A1* | 4/2013 | Picard | ................. | H04L 27/0012 370/310 |

OTHER PUBLICATIONS

Core,"Specification of the Bluetooth System", Master Table of Contents & Compliance Requirements—Core V4.0, Jun. 30, 2010, 2302 pages.
Core,"Specification of the Bluetooth System", Master Table of Contents & Compliance Requirements—Core V4.1, Dec. 3, 2013, 2684 pages.

* cited by examiner

*Primary Examiner* — Omar Ghowrwal
*Assistant Examiner* — Angel Brockman

(57) ABSTRACT

The present disclosure describes methods and apparatus for wirelessly connecting a plurality of devices for communication in a network. A wireless transceiver device can attempt to wirelessly connect to another wireless transceiver device using a first technique or a second technique. At various times while performing the first technique and the second technique, one or both of the wireless transceiver devices can listen for packets for the different techniques concurrently. In response to receiving a particular type of packet used by the second technique, the wireless transceiver device interrupts the first technique to perform the second technique to connect to another wireless transceiver device (from which the particular type of packet was received). The wireless transceiver device can then proceed with again attempting to wirelessly connect to another wireless transceiver device using the first technique.

20 Claims, 11 Drawing Sheets

METHODS, APPARATUS, AND DEVICE FOR WIRELESSLY CONNECTING A PLURALITY OF DEVICES FOR COMMUNICATION IN A NETWORK

CROSS-REFERENCE TO RELATED APPLICATION

This present disclosure claims priority to U.S. Provisional Patent Application Ser. No. 61/911,713 filed Dec. 4, 2013, the disclosure of which is incorporated herein by reference in its entirety.

BACKGROUND

As the number and types of computing and other electronic devices that are available has increased, it has become increasingly important for devices to be able to communicate with one another. This communication oftentimes involves sending (or transmitting) data from one device to another via a wireless connection. Although wireless connections allow data to be communicated among various devices without having to attach data cables to the devices, wireless connections are not without their problems. One such problem is that it can take a significant amount of time for two devices to establish a wireless connection with one another, which can lead to user frustration with their devices.

SUMMARY

This summary is provided to introduce subject matter that is further described below in the Detailed Description and Drawings. Accordingly, this Summary should not be considered to describe essential features nor used to limit the scope of the claimed subject matter.

In general, in one aspect, this specification describes a method implemented in a first wireless transceiver device. The method includes simultaneously using each of a first technique and a second technique in initially attempting to wirelessly connect the first wireless transceiver device with one or more wireless transceiver devices, wherein the first technique is different from the second technique; listening, on a particular one of multiple channels, for a first particular type of packet from a second wireless transceiver device to establish a wireless connection with the second device using the first technique; listening, on the particular one channel, concurrently with listening for the first particular type of packet, for a second particular type of packet from a third wireless transceiver device to establish a wireless connection with the third wireless transceiver device using the second technique; and in response to receiving the second particular type of packet, interrupting the first technique and performing the second technique to wirelessly connect the first wireless transceiver device to the third wireless transceiver device.

In general, in another aspect, this specification describes a first wireless transceiver device, the first wireless transceiver device comprising a transceiver and a latency reducing connection system. The transceiver is configured to transmit packets to one or more wireless transceiver devices and receive packets from the one or more wireless transceiver devices. The latency reducing connection system is configured to simultaneously use each of a first technique and a second technique in initially attempting to wirelessly connect the first wireless transceiver device with the one or more wireless transceiver devices, wherein the first technique is different from the second technique, listen, on a particular one of multiple channels, for a first particular type of packet from a second wireless transceiver device to establish a wireless connection with the second device using the first technique, listen, on the particular one channel, concurrently with listening for the first particular type of packet, for a second particular type of packet from a third wireless transceiver device to establish a wireless connection with the third wireless transceiver device using the second technique, and in response to receiving the second particular type of packet, interrupt the first technique and perform the second technique to wirelessly connect the first wireless transceiver device to the third wireless transceiver device.

In general, in another aspect, this specification describes a computer-readable memory device comprising computer-executable instructions that, when executed, implement a system in a first wireless transceiver device to simultaneously use each of a first technique and a second technique in initially attempting to wirelessly connect the first wireless transceiver device with one or more wireless transceiver devices, wherein the first technique is different from the second technique; listen, on a particular one of multiple channels, for a first particular type of packet from a second wireless transceiver device to establish a wireless connection with the second device using the first technique; listen, on the particular one channel, concurrently with listening for the first particular type of packet, for a second particular type of packet from a third wireless transceiver device to establish a wireless connection with the third wireless transceiver device using the second technique; and in response to receiving the second particular type of packet, interrupt the first technique and perform the second technique to wirelessly connect the first wireless transceiver device to the third wireless transceiver device.

The details of one or more implementations are set forth in the accompanying drawings and the description below. Other features and advantages will be apparent from the description and drawings.

BRIEF DESCRIPTION OF THE DRAWINGS

In the figures, the left-most digit of a reference number identifies the figure in which the reference number first appears. The use of the same reference numbers in different instances in the description and the figures indicate like elements.

DETAILED DESCRIPTION

Methods and apparatus for wirelessly connecting a plurality of devices for communication in a network are discussed herein. A wireless transceiver device can attempt to wirelessly connect to another wireless transceiver device using two different techniques, such as a paging based technique or a low latency reconnect (LLR) technique. The paging based technique includes transmitting paging packets and paging response packets by the different wireless transceiver devices, and the low latency reconnect technique includes transmitting trigger code word packets and receiving beacon frame packets. The various packets are transmitted on one or more of multiple different channels, each channel referring to a different radio frequency. As part of performing each of the different techniques, the wireless transceiver devices listen for packets. A wireless transceiver device listening for a particular type of packet refers to one wireless transceiver device operating in a mode where, if another wireless transceiver device were to transmit the particular type of packet on a particular frequency, the one wireless transceiver device would receive the transmitted packet.

At various times while performing the different techniques, one or both of the wireless transceiver devices can listen for packets for the different techniques concurrently. For example, a wireless transceiver device can be listening for a first particular type of packet used in the paging based technique (e.g., a paging packet or a paging response packet) while at the same time listening for a second particular type of packet used in the low latency reconnect technique (e.g., a beacon frame packet or a trigger code word packet). In response to receiving the second particular type of packet, the wireless transceiver device interrupts the paging based technique to perform the low latency reconnect technique to connect to another wireless transceiver device (from which the second particular type of packet was received). The wireless transceiver device can then proceed with again attempting to wirelessly connect to another wireless transceiver device using the paging based technique.

Figure 1:
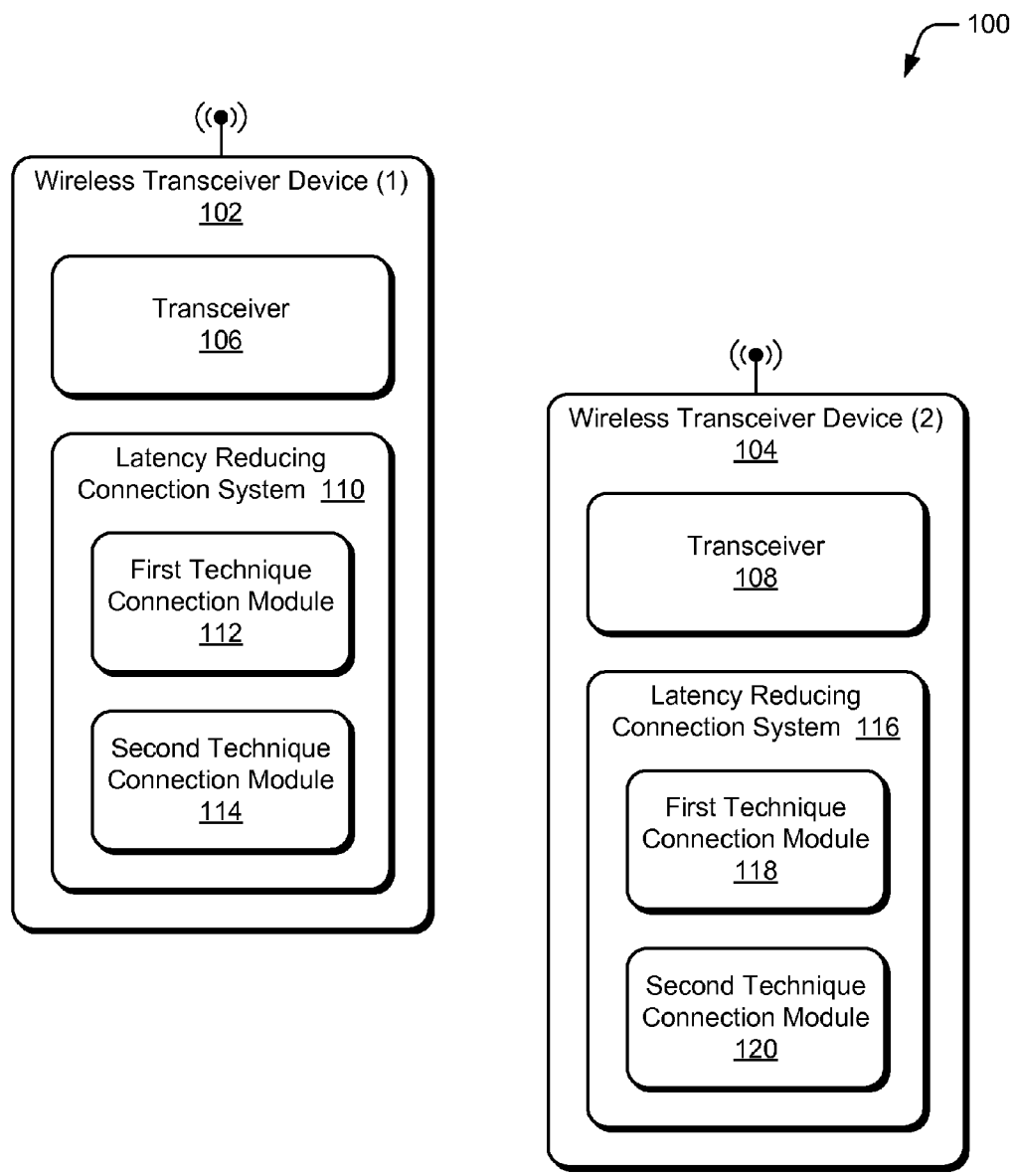
FIG. 1 illustrates an example wireless data communication system in which the methods and apparatus for wirelessly connecting a plurality of devices for communication in a network can be used in accordance with one or more embodiments.

FIG. 1 illustrates an example wireless data communication system 100 in which the methods and apparatus for wirelessly connecting a plurality of devices for communication in a network can be used in accordance with one or more embodiments. The wireless data communication system 100 includes a wireless transceiver device 102 and a wireless transceiver device 104. The wireless transceiver device 102 includes a transceiver 106 that transmits data that can be received by the wireless transceiver device 104, and also receives data transmitted by the wireless transceiver device 104. The wireless transceiver device 104 includes a transceiver 108 that transmits data that can be received by the wireless transceiver device 102, and also receives data transmitted by the wireless transceiver device 102.

The wireless transceiver device 102 and the wireless transceiver device 104 communicate with one another by establishing a wireless connection with one another using a wireless communication protocol. Any of a variety of different wireless communication protocols can be used. In one or more embodiments, the wireless communication protocol is a protocol that complies with or adheres to one or more of the Bluetooth specifications, such as the Bluetooth Specification version 4.0 (Jun. 30, 2010), or the Bluetooth Specification version 4.1 (Dec. 4, 2013).

In one or more embodiments, the wireless transceiver device 102 and the wireless transceiver device 104 communicate with one another using one or more particular channels. Each channel is a different one of multiple different radio frequencies. In one example of the different radio frequencies, the different radio frequencies are in the range of 2.400-2.4835 Gigahertz (GHz), with different channels being spaced approximately 1 Megahertz (MHz) apart.

The wireless transceiver device 102 includes a latency reducing connection system 110. The latency reducing connection system 110 includes a first technique connection module 112 allowing the latency reducing connection system 110 to establish a wireless connection with the wireless transceiver device 104 using a first technique (e.g., a paging based technique). The latency reducing connection system 110 also includes a second technique connection module 114 allowing the latency reducing connection system 110 to establish a wireless connection with the wireless transceiver device 104 using a second technique (e.g., a low latency reconnect technique).

Similarly, the wireless transceiver device 104 includes a latency reducing connection system 116. The latency reducing connection system 116 includes a first technique connection module 118 allowing the latency reducing connection system 116 to establish a wireless connection with the wireless transceiver device 102 using the first technique (e.g., a paging based technique). The latency reducing connection system 116 also includes a second technique connection module 120 allowing the latency reducing connection system 116 to establish a wireless connection with the wireless transceiver device 102 using the second technique (e.g. a low latency reconnect technique).

The methods and apparatus for wirelessly connecting a plurality of devices for communication in a network are discussed herein with reference to two different connection techniques, referred to as a first technique and a second technique. In one or more embodiments, the first technique is a paging based technique and the second technique is a low latency reconnect technique. It should be noted, however, that the paging based technique and the low latency reconnect technique are only examples of the first technique and the second technique, and that various other wireless communication techniques can be used as the first technique and/or the second technique rather than the paging based technique and/or the low latency reconnect technique.

The paging based technique for establishing a wireless connection refers to one wireless transceiver device (referred to as a master device) transferring one or more paging packets at one or more different frequencies for a first duration of time (e.g., 625 microseconds), followed by another wireless transceiver device (referred to as a slave device) responding with a paging response packet during a second duration of time (e.g., 625 microseconds). Each paging packet includes various data identifying the packet as a paging packet (including, for example, an identifier of the master device and/or an identifier of the slave device), and each paging response packet includes various data identifying the packet as a paging response packet. During the first duration of time the slave device receives a paging packet on one of the frequencies, and during the second duration of time the slave device responds with a paging response packet on the same frequency as the paging packet was received. One or more additional packets can subsequently be exchanged based on the protocol supported by the master and slave devices to complete establishment of the wireless connection. The master device transmitting paging packets and listening for a response from a slave device can be repeated many times while the master device waits for a response from the slave device. The paging based technique can be used in various situations, including when the master device and slave device have no prior knowledge of one another (e.g., in situations where the master device and slave device have not previously wirelessly connected).

The low latency reconnect technique for establishing a wireless connection refers to one wireless transceiver device (referred to as the slave device) transmitting a trigger code word packet on a particular one of one or more different frequencies for a first duration of time (e.g., 625 milliseconds). During the first duration of time, another wireless transceiver device (referred to as the master device) scans for the code word on multiple (e.g., three) different frequencies. In response to detecting the code word, the master device transmits a beacon frame packet during a second duration of time (e.g., 625 milliseconds). The trigger code word packet includes various data identifying the packet as a trigger code word packet, and the beacon frame packet includes various data identifying the packet as a beacon frame packet. One or more additional packets can subsequently be exchanged based on the protocol supported by the master and slave devices to complete establishment of the wireless connection. The low latency reconnect technique can be used in situations in which the master device and slave device have prior knowledge of one another (e.g., in situations where the master device and slave device have previously wirelessly connected).

The low latency reconnect technique allows a wireless connection to be established more quickly than can typically be done with the paging based technique. The "low" latency refers to the time taken to establish the wireless connection being less than the time taken to establish the wireless connection using the paging based technique. The low latency reconnect technique is used in situations in which the two wireless transceiver devices have previously been wirelessly connected to one another and are being reconnected. The wireless transceiver devices can maintain information about one another, allowing the wireless connection to be established in less time than can be done with the paging based technique because the information about one another is maintained by the wireless transceiver devices rather than needing to be communicated between the wireless transceiver devices while establishing the wireless connection.

Some of the discussions of the first technique and the second technique herein include references to an initiator device and a target device. An initiator device is the initiator of the wireless connection, and a target device is the target of the wireless connection. Each of the initiator device and the target device can be a master device or a slave device. In situations in which one of the initiator device and the target device is operating as a master device, the other is operating as a slave device. Similarly, in situations in which one of the initiator device and the target device is operating as a slave device, the other is operating as a master device.

It should be noted that although the wireless transceiver device 102 and the wireless transceiver device 104 are both illustrated as including a latency reducing connection system, alternatively only one of the wireless transceiver device 102 and the wireless transceiver device 104 includes a latency reducing connection system. Both the wireless transceiver device 102 and the wireless transceiver device 104 can still support the low latency reconnect technique, but both need not support the latency reducing connection system.

Figure 2:
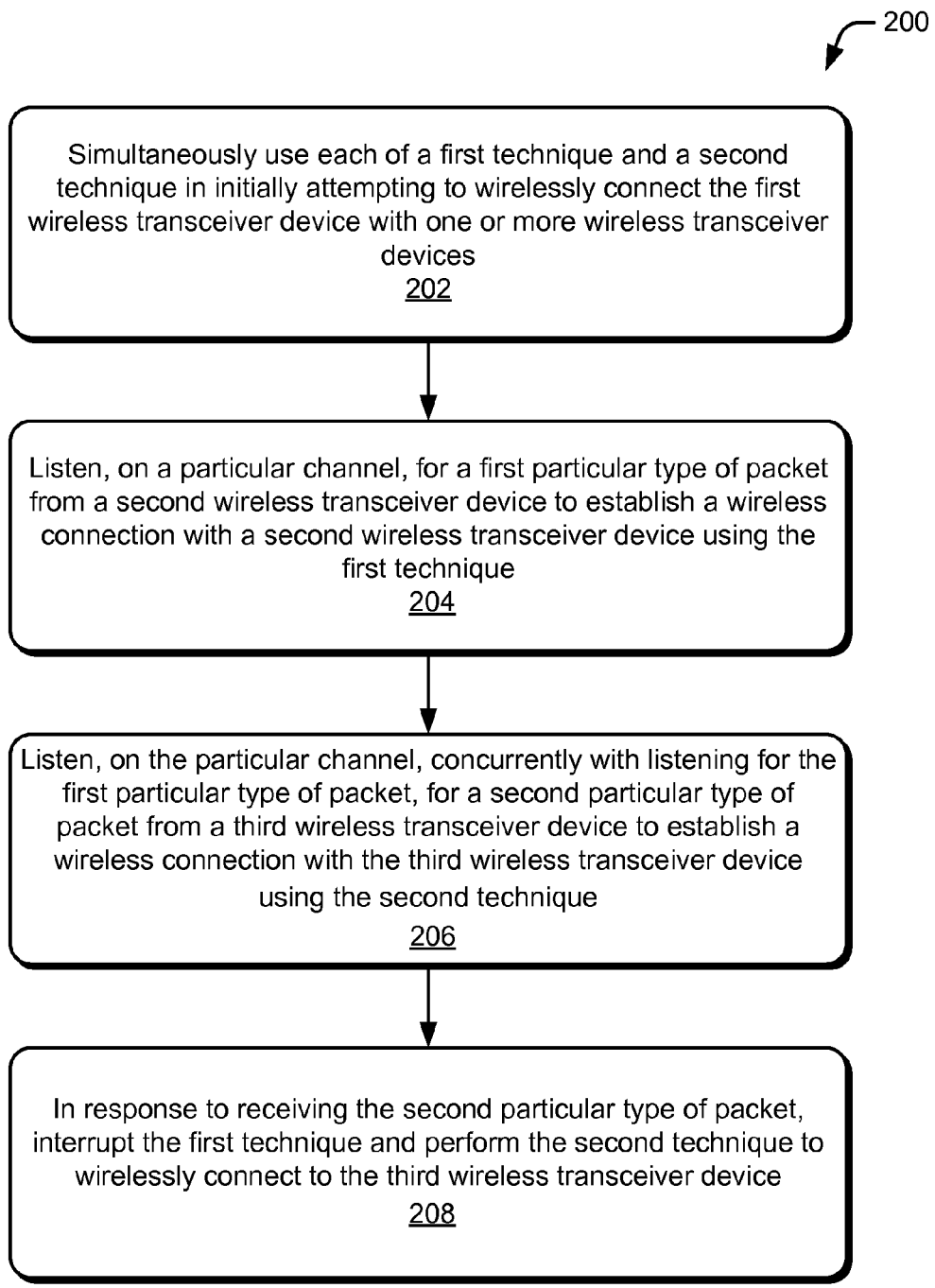
FIG. 2 is a flowchart illustrating an example process for wirelessly connecting a plurality of devices for communication in a network in accordance with one or more embodiments.

FIG. 2 is a flowchart illustrating an example process 200 for wirelessly connecting a plurality of devices for communication in a network in accordance with one or more embodiments. Process 200 is described in the form of a set of blocks that specify operations to be performed, however the operations are not necessarily limited to the order shown. The operations performed by the set of blocks in process 200 are performed by a first wireless transceiver device, such as a wireless transceiver device 102 or 104 of FIG. 1.

At block 202, a first technique and a second technique are simultaneously used in initially attempting to wirelessly connect to one or more wireless transceiver devices. The first technique can be the paging based technique and the second technique can be the low latency reconnect technique as discussed above, as well as in further detail below.

At block 204, the first wireless transceiver device listens, on a particular one of multiple channels, for a first particular type of packet from a second wireless transceiver device to establish a wireless connection with the second wireless transceiver device using the first technique. The first particular type of packet can be different types of packets based on the implementation, such as a paging packet or a paging response packet as discussed in more detail below.

At block 206, the first wireless transceiver device listens for a second particular type of packet from a third wireless transceiver device to establish a wireless connection with the third wireless transceiver device using the second technique. At block 206, the wireless transceiver device listens on the same channel as the first wireless transceiver device listens for the first particular type of packet at block 204. Furthermore, blocks 204 and 206 are performed concurrently—the first wireless transceiver device listens for the first particular type of packet at the same time the first wireless transceiver device listens for the second particular type of packet. The second and third wireless transceiver devices are typically two different wireless transceiver devices, although can alternatively be the same wireless transceiver device. The second particular type of packet can be different types of packets based on the implementation, such as a beacon frame packet or a trigger code word packet as discussed in more detail below.

At block 208, in response to receiving the second particular type of packet, the first wireless transceiver device interrupts the first technique to perform the second technique, connecting the first wireless transceiver device to the third wireless transceiver device. By connecting the first wireless transceiver device to the third wireless transceiver device, the first technique is interrupted or punctured. Accordingly, after connecting the first wireless transceiver device to the third wireless transceiver device, the first technique is restarted.

Figure 3:
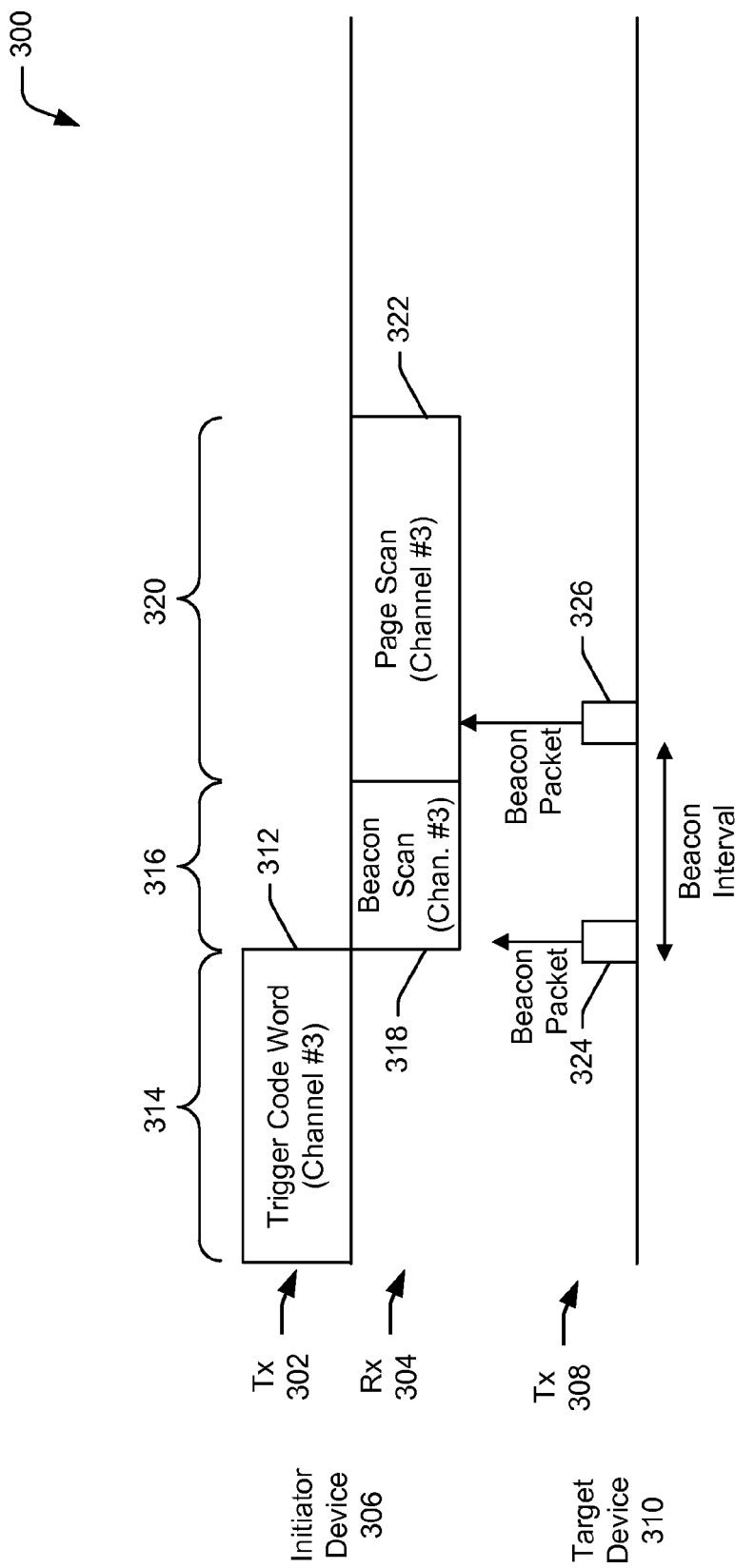
FIGS. 3, 4, 5, 6, 7, 8, 9, and 10 are timing diagrams illustrating wirelessly connecting a plurality of devices for communication in a network in accordance with one or more embodiments.
Figure 4:
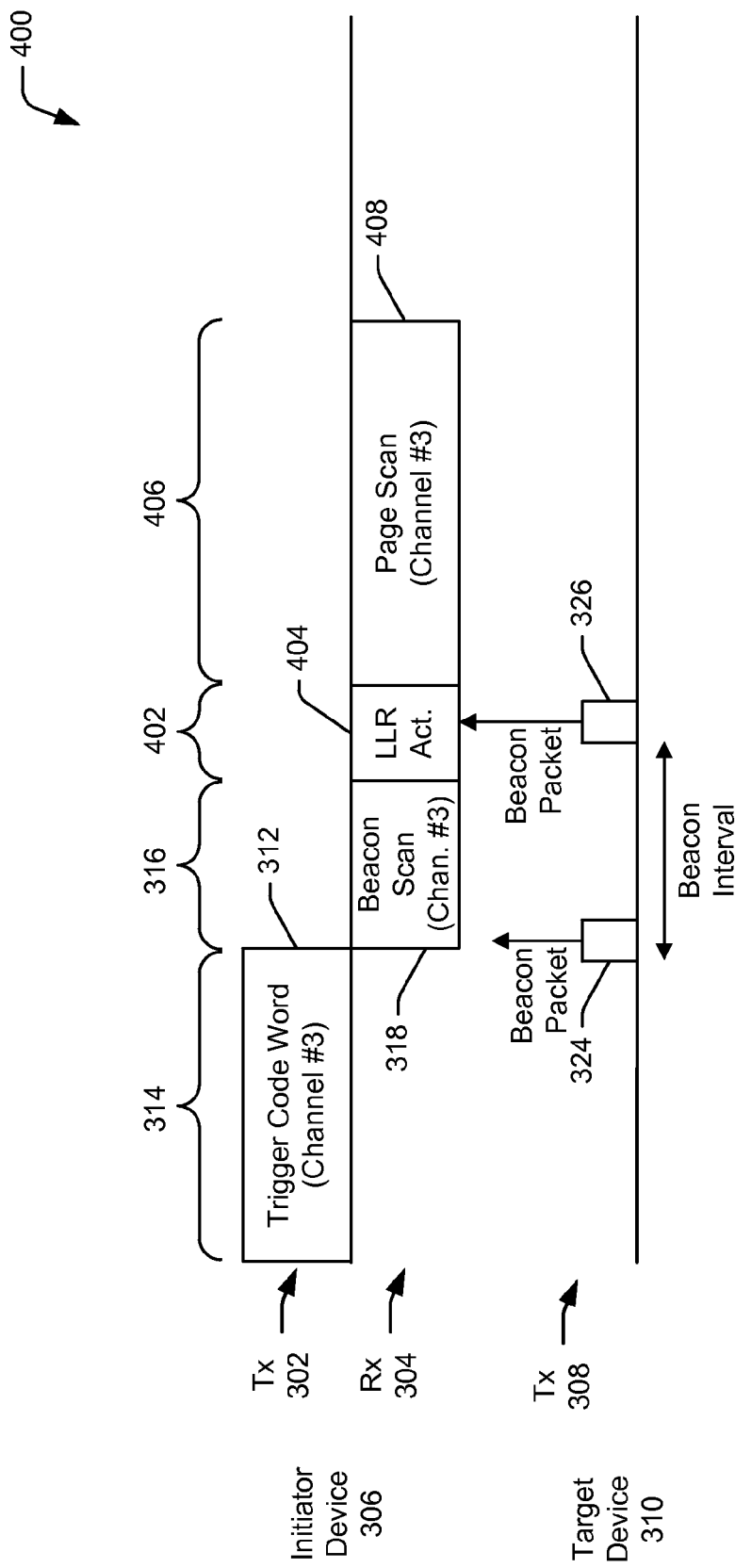

FIG. 3 and FIG. 4 are timing diagrams illustrating wirelessly connecting a plurality of devices for communication in a network in accordance with one or more embodiments. FIG. 3 and FIG. 4 illustrate an example in which a beacon scan of the second technique (e.g., an LLR technique) is shared with a page scan of the first technique (e.g., the paging based technique)—a wireless transceiver device listens for packets for the beacon scan and the page scan concurrently, as discussed in more detail below.

FIG. 3 illustrates a timing diagram 300 with example timings of transmitting (Tx) 302 and receiving (Rx) 304 of signals for an initiator device 306 (the initiator of the wireless connection), and transmitting 308 of signals for a target device 310 (the target of the wireless connection). In the example of FIG. 3, the initiator device 306 is a slave device and the target device 310 is a master device.

The initiator device 306 attempts to establish a wireless connection with the target device 310 using the second technique by transmitting packets including a trigger code word on a particular channel for a duration of time, illustrated as trigger code word 312 on channel #3 for a duration of time 314. The initiator device 306 then listens for a particular type of packet (a beacon frame packet) from the target device 310 for a duration of time 316. The initiator device 306 listens on the same channel as the channel on which the trigger code word 312 was transmitted (channel #3 in the illustrated example). This listening is illustrated in the timing diagram 300 as a beacon scan 318.

The initiator device 306, in response to not receiving a beacon frame packet during the duration of time 316, proceeds to attempt to establish a wireless connection with a wireless transceiver device (the target device 310 or another wireless transceiver device) using the first technique during the duration of time 320. This attempt to establish the wireless connection using the first technique is the initiator device 306 listening for paging packets, illustrated as page scan 322. In the illustrated example of FIG. 3, the initiator device 306 is listening for paging packets on the same channel (illustrated as channel #3) as the initiator device 306 was listening for beacon frame packets during the beacon scan 318.

In the illustrated example of FIG. 3, the target device 310 transmits a beacon frame packet 324 during the duration of time 316, but the beacon frame packet 324 is not received by the initiator device 306. The beacon frame packet 324 may not be received for various reasons, such as interference from other devices. The target device 310 transmits beacon frame packets at a particular interval (referred to as the beacon interval) for some duration of time or until a response to a beacon frame packet is received at the target device 310. Thus, because the target device 310 does not receive a response to the beacon frame packet 324, the target device 310 transmits a beacon frame packet 326. The beacon frame packets 324 and 326 are transmitted on the same channel as the trigger code word 312 (illustrated as channel #3).

The initiator device 306 is listening during the page scan 322 for paging packets as well as listening for beacon frame packets. The initiator device 306 is thus concurrently listening for paging packets and beacon frame packets.

The initiator device 306, in response to receiving the beacon frame packet 326, proceeds with establishing a wireless connection with the target device 310 using the second technique. The beacon frame packet 326 interrupts or punctures the first technique, effectively stopping and then re-starting the first technique to allow the initiator device 306 to establish a wireless connection with the target device 310 using the second technique.

FIG. 4 illustrates an example timing diagram 400 illustrating the interruption of the first technique. The timing diagram 400 includes example timings of transmitting 302 and receiving 304 of signals for an initiator device 306, transmitting 308 of signals for a target device 310, the trigger code word 312, the duration of time 314, the duration of time 316, the beacon scan 318, the beacon frame packet 324, and the beacon frame packet 326 as discussed with reference to FIG. 3. However, the timing diagram 400 shows a duration of time 402 during which establishment of a wireless connection between the initiator device 306 and the target device 310 is completed, illustrated as LLR activity (act.) 404. Various packets can be communicated between the initiator device 306 and the target device 310 during the duration of time 402.

The page scan 322 of FIG. 3 was interrupted or punctured by the beacon frame packet 326, and thus the first technique is stopped and delayed until after the wireless connection between the initiator device 306 and the target device 310 has been established using the second technique (during the duration of time 402). After the duration of time 402 elapses, the initiator device 306 again proceeds to attempt to establish a wireless connection using the first technique during the duration of time 406. This attempt to establish the wireless connection using the first technique is the initiator device 306 listening for paging packets, illustrated as page scan 408. The page scan 408 is thus extended relative to the page scan 322 illustrated in FIG. 3.

As illustrated in FIGS. 3 and 4, the latency when establishing a wireless connection between two wireless transceiver devices (the initiator device 306 and the target device 310) is reduced for the second technique. Rather than having to wait for the duration of time 320 for the page scan 322 to elapse before another trigger code word can be transmitted, the connection established using the second technique interrupts the first technique and thus more quickly establishes a wireless connection between the initiator device 306 and the target device 310.

It should be noted that if the beacon frame packet 326 were not received by the initiator device 306, and any subsequent beacon frame packets transmitted by the target device 310 during the duration of time 320 were also not received by the initiator device 306, then the initiator device 306 proceeds to attempt to establish a wireless connection with the target device 310 by alternating between attempting to establish a connection using the first technique connection and the second technique.

Figure 5:
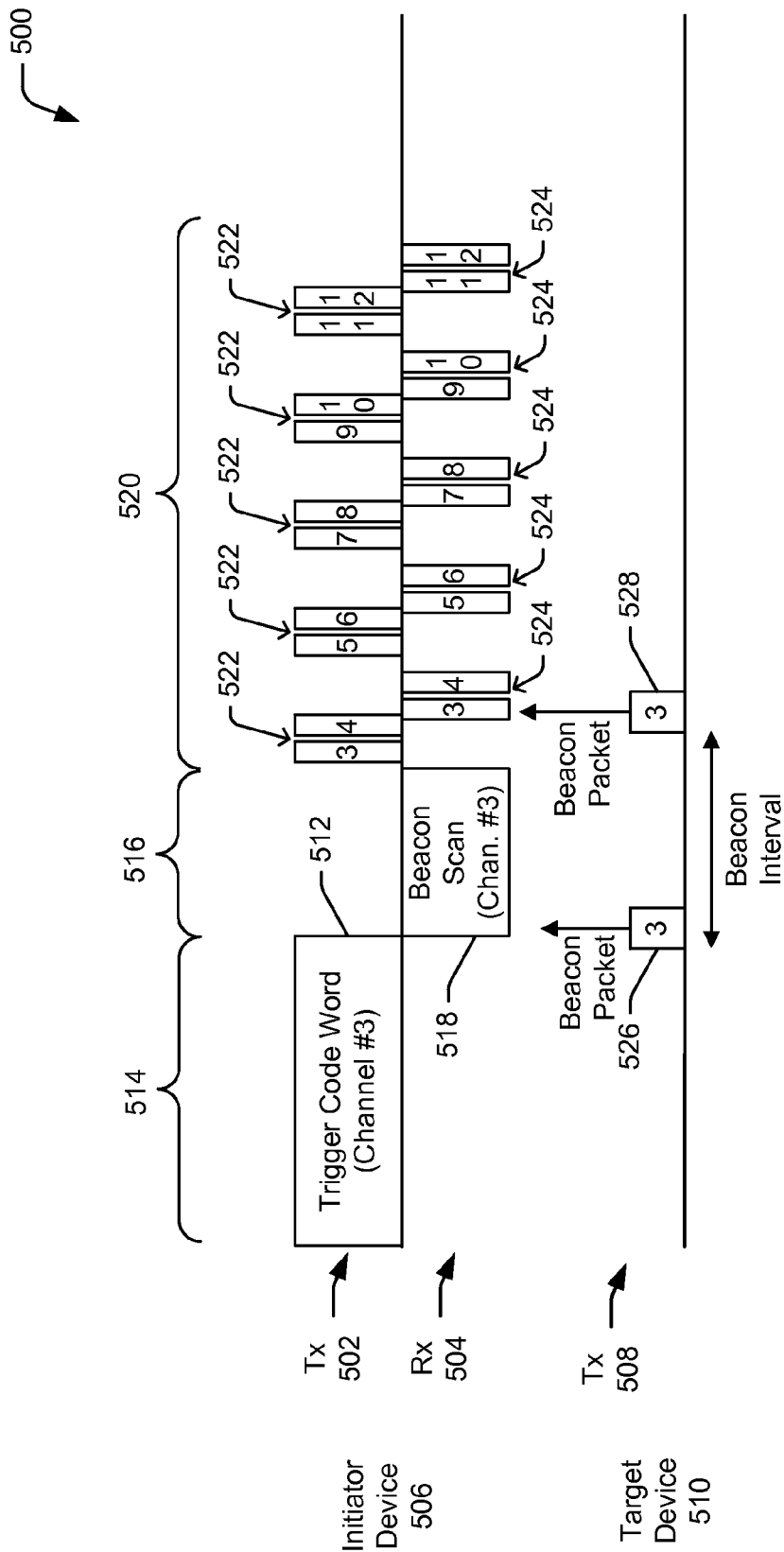
Figure 6:
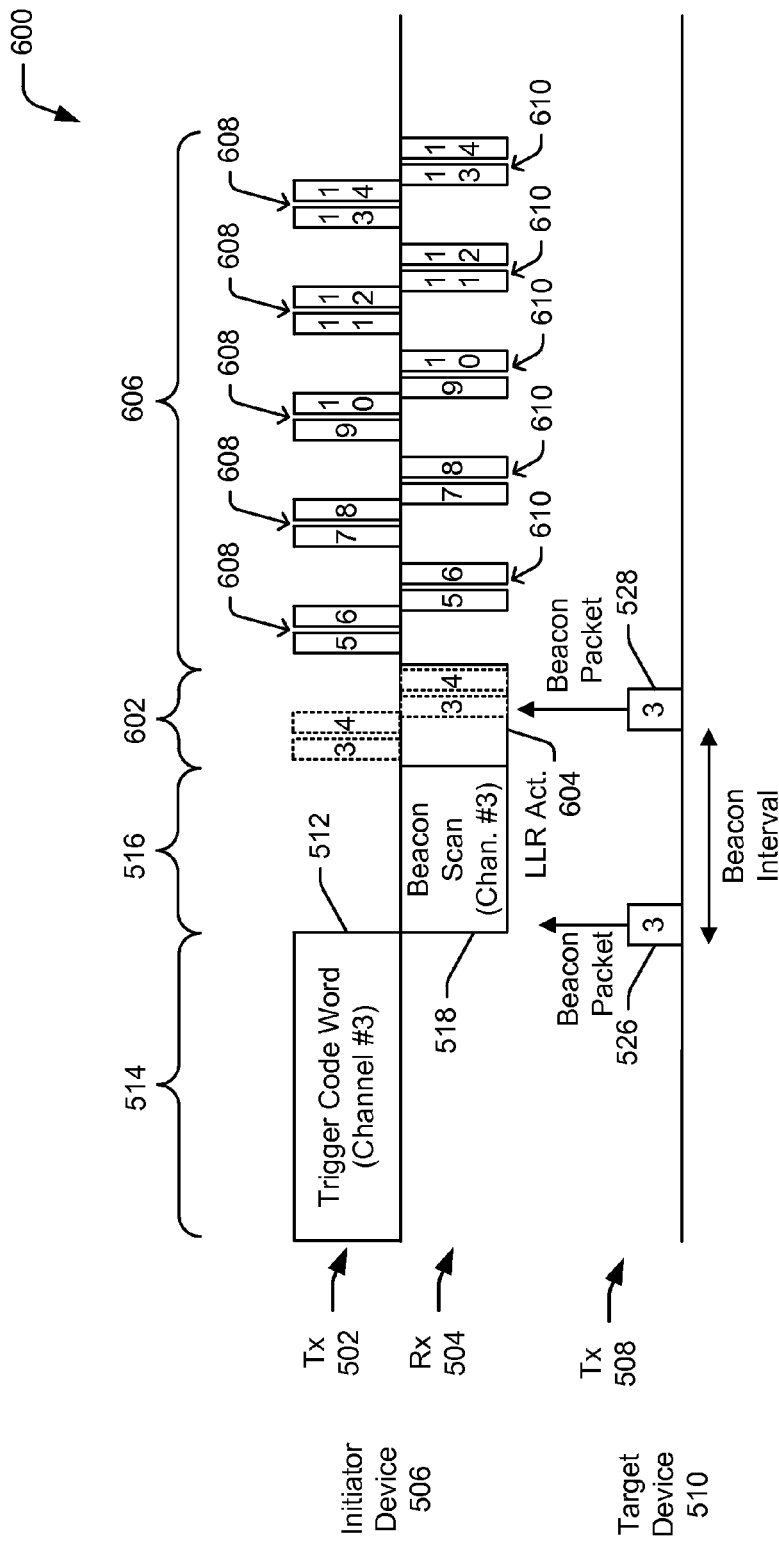

FIG. 5 and FIG. 6 are timing diagrams illustrating wirelessly connecting a plurality of devices for communication in a network in accordance with one or more embodiments. FIG. 5 and FIG. 6 illustrate an example in which a beacon scan of the second technique (e.g., the LLR technique) is shared with a paging response detection of the first technique (e.g., the paging based technique)—a wireless transceiver device listens for packets for the beacon scan and the paging response concurrently, as discussed in more detail below.

FIG. 5 illustrates a timing diagram 500 with example timings of transmitting 502 and receiving 504 of signals for an initiator device 506 (the initiator of the wireless connection), and transmitting 508 of signals for a target device 510 (the target of the wireless connection).

The initiator device 506 attempts to establish a wireless connection with the target device 510 using the second technique by transmitting packets including a trigger code word on a particular channel for a duration of time, illustrated as trigger code word 512 on channel #3 for a duration of time 514. The initiator device 506 then listens for a particular type of packet (a beacon frame packet) from the target device 510 for a duration of time 516. The initiator device 506 listens on the same channel as the channel on which the trigger code word 512 was transmitted (channel #3 in the illustrated example). This listening is illustrated in the timing diagram 500 as a beacon scan 518.

The initiator device 506, in response to not receiving a beacon frame packet during the duration of time 516, proceeds to attempt to establish a wireless connection with a wireless transceiver device (the target device 510 or another wireless transceiver device) using the first technique during the duration of time 520. During the duration of time 520 the initiator device 506 acts as a master device for the first technique, listening for paging response packets 524 and transmitting paging packets 522. During the duration of time 520, the channels being used vary (and are illustrated as values within the paging response packets 524 and transmitting paging packets 522 in FIG. 5) although the initiator device 506 listens for the paging response packets 524 on the same one or more channels as the paging packets 522 are transmitted (e.g., one packet on channel #3 and another packet on channel #4, one packet on channel #5 and another on channel #6, one packet on channel #7 and another on channel #8, and so forth as illustrated in FIG. 5). In the illustrated example of FIG. 5, the initiator device 506 is listening for some paging response packets on the same channel (illustrated as channel #3) as the initiator device 506 was listening for beacon frame packets during the beacon scan 518.

In the illustrated example of FIG. 5, the target device 510 transmits a beacon frame packet 526 during the duration of time 516, but the beacon frame packet 526 is not received by the initiator device 506. The beacon frame packet 526 may not be received for various reasons, such as interference from other devices. The target device 510 transmits beacon frame packets at a particular interval (referred to as the beacon interval) for some duration of time or until a response to a beacon frame packet is received at the target device 510. Thus, because the target device 510 does not receive a response to the beacon frame packet 526, the target device 510 transmits a beacon frame packet 528. The beacon frame packets 526 and 528 are transmitted on the same channel as the trigger code word 512 (illustrated as channel #3).

The initiator device 506 is listening during the duration of time 520 for paging response packets as well as listening for beacon frame packets. The initiator device 506 is thus concurrently listening for paging response packets and beacon frame packets.

The initiator device 506, in response to receiving the beacon frame packet 528, proceeds with establishing a wireless connection with the target device 510 using the second technique. The beacon frame packet 528 interrupts or punctures the first technique, effectively stopping and then re-starting the first technique to allow the initiator device 506 to establish a wireless connection with the target device 510 using the second technique.

FIG. 6 illustrates an example timing diagram 600 illustrating the interruption of the first technique. The timing diagram 600 includes example timings of transmitting 502 and receiving 504 of signals for an initiator device 506, transmitting 508 of signals for a target device 510, the trigger code word 512, the duration of time 514, the duration of time 516, the beacon scan 518, the beacon frame packet 526, and the beacon frame packet 528 as discussed with reference to FIG. 5. However, the timing diagram 600 shows a duration of time 602 during which establishment of a wireless connection between the initiator device 506 and the target device 510 is completed, illustrated as LLR activity 604. Various packets can be communicated between the initiator device 506 and the target device 510 during the duration of time 602.

The listening for paging response packets 524 and transmitting paging packets 522 of FIG. 5 was interrupted or punctured by the beacon frame packet 528, and thus the first technique is stopped and delayed until after the wireless connection between the initiator device 506 and the target device 510 has been established using the second technique (during the duration of time 602). After the duration of time 602 elapses, the initiator device 506 again proceeds to act as a master device for the first technique, attempting to establish a wireless connection using the first technique during the duration of time 606. This attempt to establish the wireless connection using the first technique is the initiator device 506 listening for paging response packets 610 and transmitting paging packets 608. The attempt to establish the wireless connection using the first technique during the duration of time 606 is thus extended relative to the duration of time 520 illustrated in FIG. 5.

As illustrated in FIGS. 5 and 6, the latency when establishing a wireless connection between two wireless transceiver devices (the initiator device 506 and the target device 510) is reduced for the second technique. Rather than having to wait for the duration of time 520 for transmitting paging packets and listening for paging response packets to elapse before another trigger code word can be transmitted, the connection established using the second technique interrupts the first technique and thus more quickly establishes a wireless connection between the initiator device 506 and the target device 510.

It should be noted that if the beacon frame packet 526 were not received by the initiator device 506, and any subsequent beacon frame packets transmitted by the target device 510 during the duration of time 520 were also not received by the initiator device 506, then the initiator device 506 proceeds to attempt to establish a wireless connection with the target device 510 by alternating between attempting to establish a connection using the first technique connection and the second technique.

Figure 7:
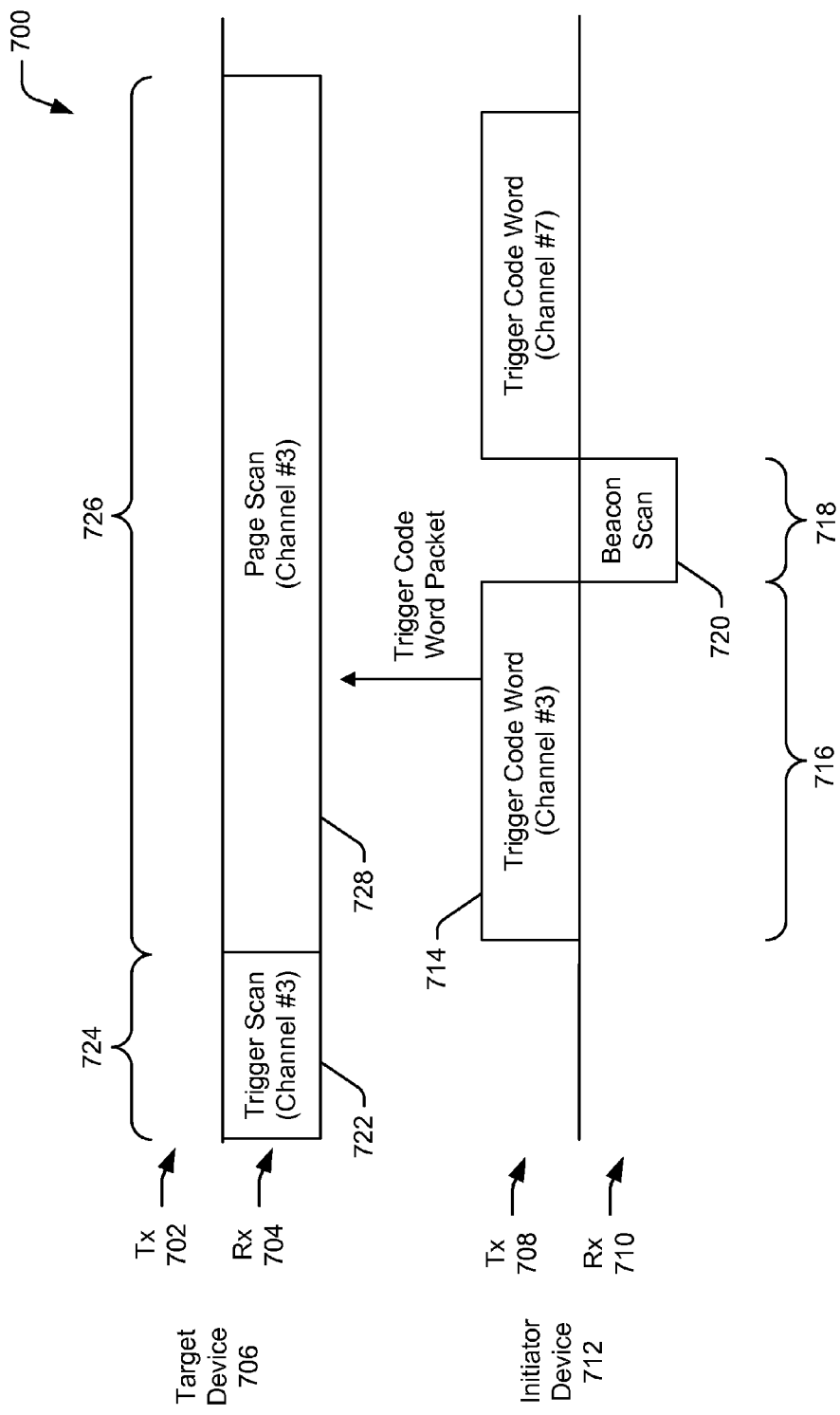
Figure 8:
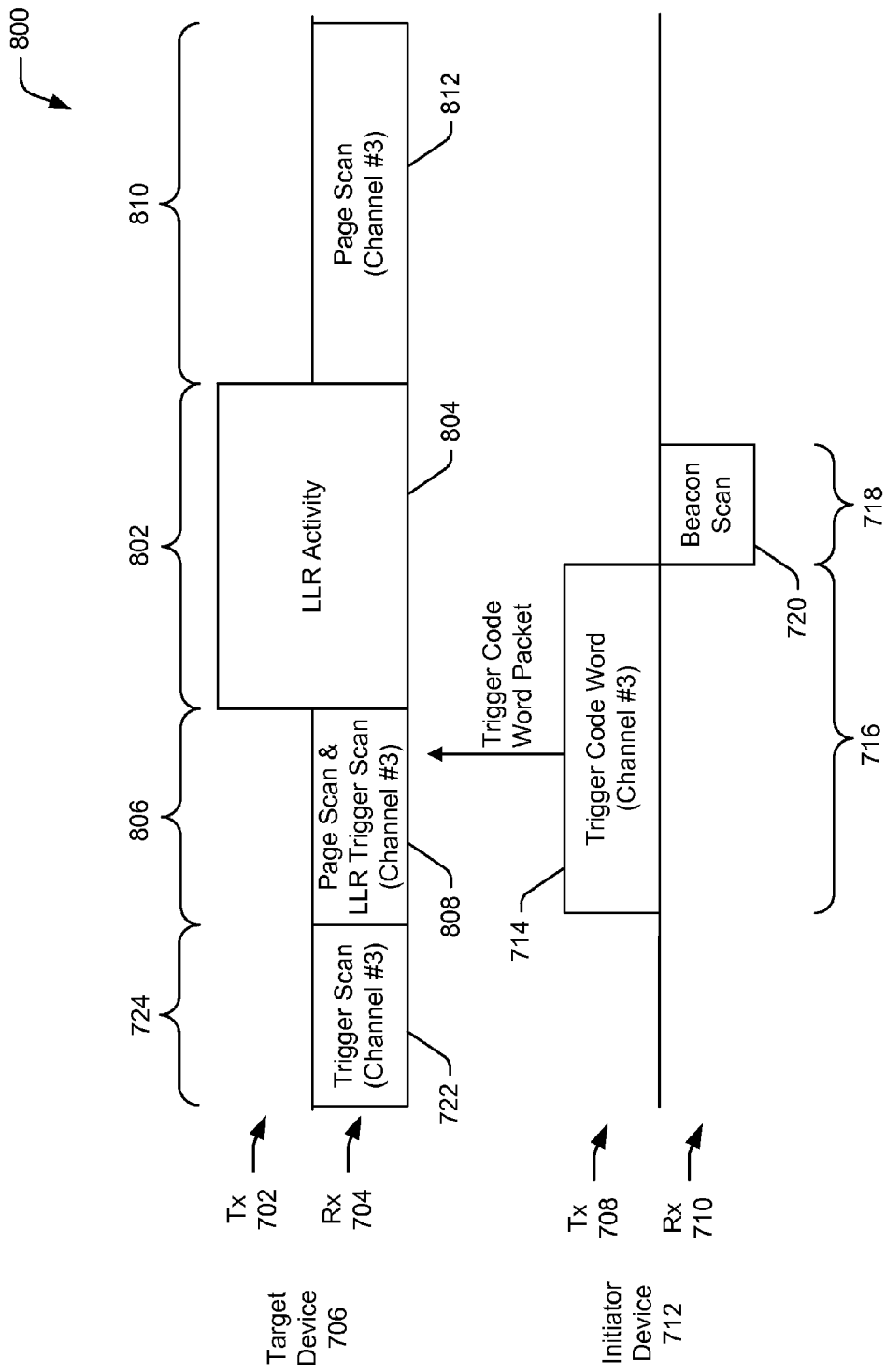

FIG. 7 and FIG. 8 are timing diagrams illustrating wirelessly connecting a plurality of devices for communication in a network in accordance with one or more embodiments. FIG. 7 and FIG. 8 illustrate an example in which a trigger scan of the second technique (e.g., the LLR technique) is shared with a page scan of the first technique (e.g., the paging based technique)—a wireless transceiver device listens for packets for the trigger scan and the page scan concurrently, as discussed in more detail below.

FIG. 7 illustrates a timing diagram 700 with example timings of transmitting 702 and receiving 704 of signals for a target device 706 (the target of the wireless connection), and transmitting 708 and receiving 710 of signals for an initiator device 712 (the initiator of the wireless connection).

The initiator device 712 attempts to establish a wireless connection with the target device 706 using the second technique by transmitting packets including a trigger code word on a particular channel for a duration of time, illustrated as trigger code word 714 on channel #3 for a duration of time 716. The initiator device 712 then listens for a particular type of packet (a beacon frame packet) from the target device 706 for a duration of time 718. The initiator device 712 listens on the same channel as the channel on which the trigger code word 714 was transmitted (channel #3 in the illustrated example). This listening is illustrated in the timing diagram 700 as a beacon scan 720.

The target device 706 listens for the trigger code word from the initiator device 712 on a particular channel for a particular duration of time, illustrated as trigger scan 722 on channel #3 for a duration of time 724. However, as illustrated in FIG. 7, the trigger scan 722 ends prior to transmission of the trigger code word 714 beginning. After the duration of time 724, in response to not receiving the trigger code word 714, the target device 706 proceeds to attempt to establish a wireless connection with a wireless transceiver device (the initiator device 712 or another wireless transceiver device) using the first technique during the duration of time 726. This attempt to establish the wireless connection using the first technique is the target device 706 acting as a slave device and listening for paging packets, illustrated as page scan 728. In the illustrated example of FIG. 7, the target device 706 operating as a slave device is listening for paging packets on the same channel (illustrated as channel #3) as the target device 706 was listening for trigger code word packets during the trigger scan 722.

The target device 706 is listening during the page scan 726 for paging packets as well as listening for the trigger code word packets. The target device 706 is thus concurrently listening for paging packets and trigger code word packets.

The target device 706, in response to receiving the trigger code word 714, proceeds with establishing a wireless connection with the initiator device 712 using the second technique. One of the packets including the trigger code word 714 interrupts or punctures the first technique, effectively stopping and then re-starting the first technique to allow the target device 706 to establish a wireless connection with the initiator device 712 using the second technique.

FIG. 8 illustrates an example timing diagram 800 illustrating the interruption of the first technique. The timing diagram 800 includes example timings of transmitting 702 and receiving 704 of signals for the target device 706, transmitting 708 and receiving 710 of signals for the initiator device 712, the trigger code word 714, the duration of time 716, the duration of time 718, the beacon scan 720, the trigger scan 722, and the duration of time 724 as discussed with reference to FIG. 7. However, the timing diagram 800 shows a duration of time 802 during which establishment of a wireless connection between the target device 706 and the initiator device 712 is completed, illustrated as LLR activity 804. Various packets can be communicated between the target device 706 and the initiator device 712 during the duration of time 802. The duration of time 802 begins in response to the target device 706 receiving the trigger code word 714 during a time duration 806 during which the target device 706 is listening for paging packets and trigger code word packets, illustrated as page scan and LLR trigger scan 808.

The page scan 726 of FIG. 7 was interrupted or punctured by the trigger code word 714, and thus the first technique is stopped and delayed until after the wireless connection between the target device 706 and the initiator device 712 has been established using the second technique (during the duration of time 802). After the duration of time 802 elapses, the target device 706 again proceeds to attempt to establish a wireless connection using the first technique during the duration of time 810. This attempt to establish the wireless connection using the first technique is the target device 706 listening for paging packets, illustrated as page scan 812. The page scan 812 is thus extended relative to the page scan 726 illustrated in FIG. 7.

As illustrated in FIGS. 7 and 8, the latency when establishing a wireless connection between two wireless transceiver devices (the target device 706 and the initiator device 712) is reduced for the second technique. Rather than having to wait for the duration of time 726 for the page scan 728 to elapse before another trigger scan can be performed, the connection established using the second technique interrupts the first technique and thus more quickly establishes a wireless connection between the target device 706 and the initiator device 712.

It should be noted that if the trigger code word 714 were not received by the target device 706 during the page scan 726, then the target device 706 proceeds to attempt to establish a wireless connection with the initiator device 712 by alternating between attempting to establish a connection using the first technique and the second technique.

Figure 9:
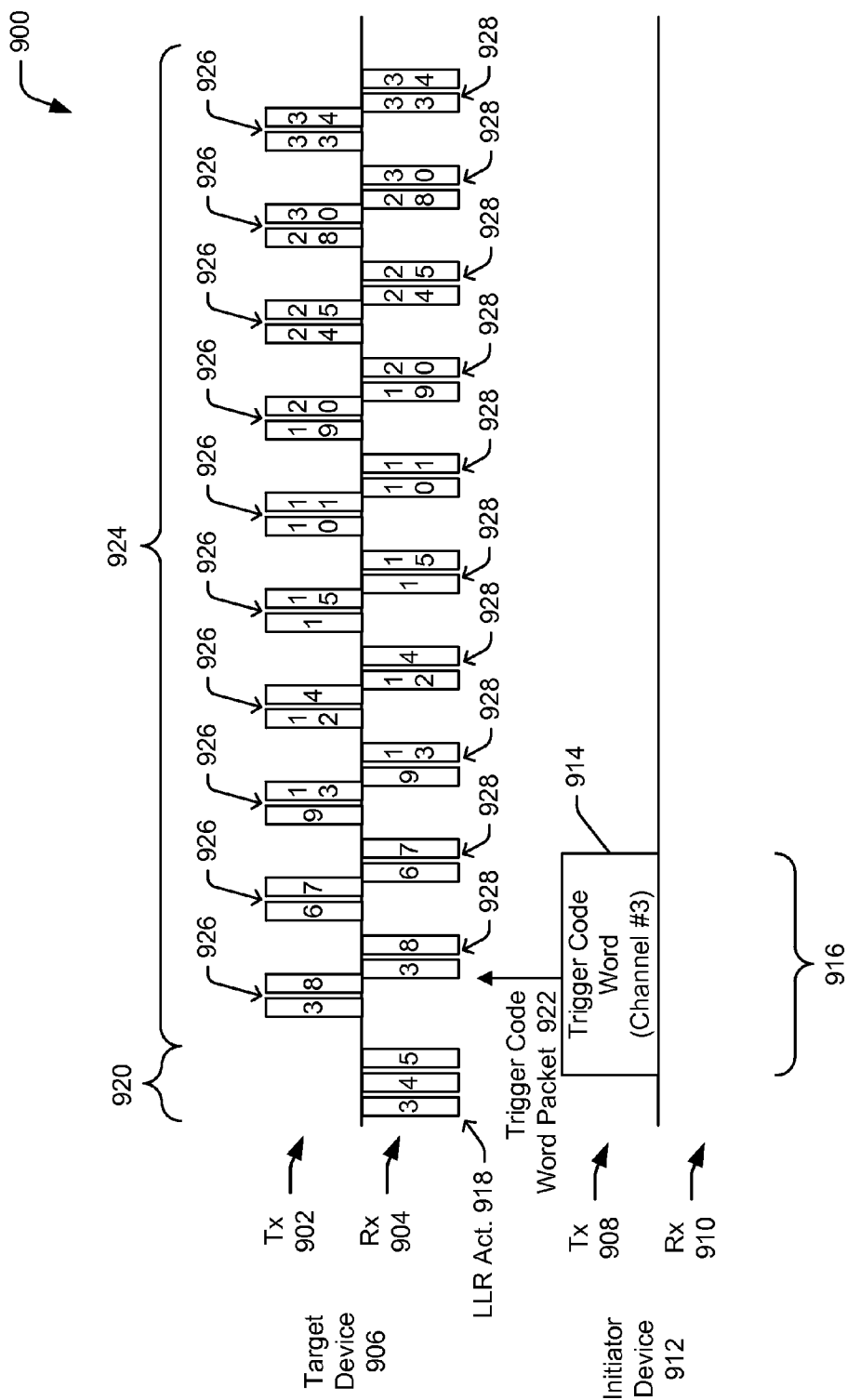
Figure 10:
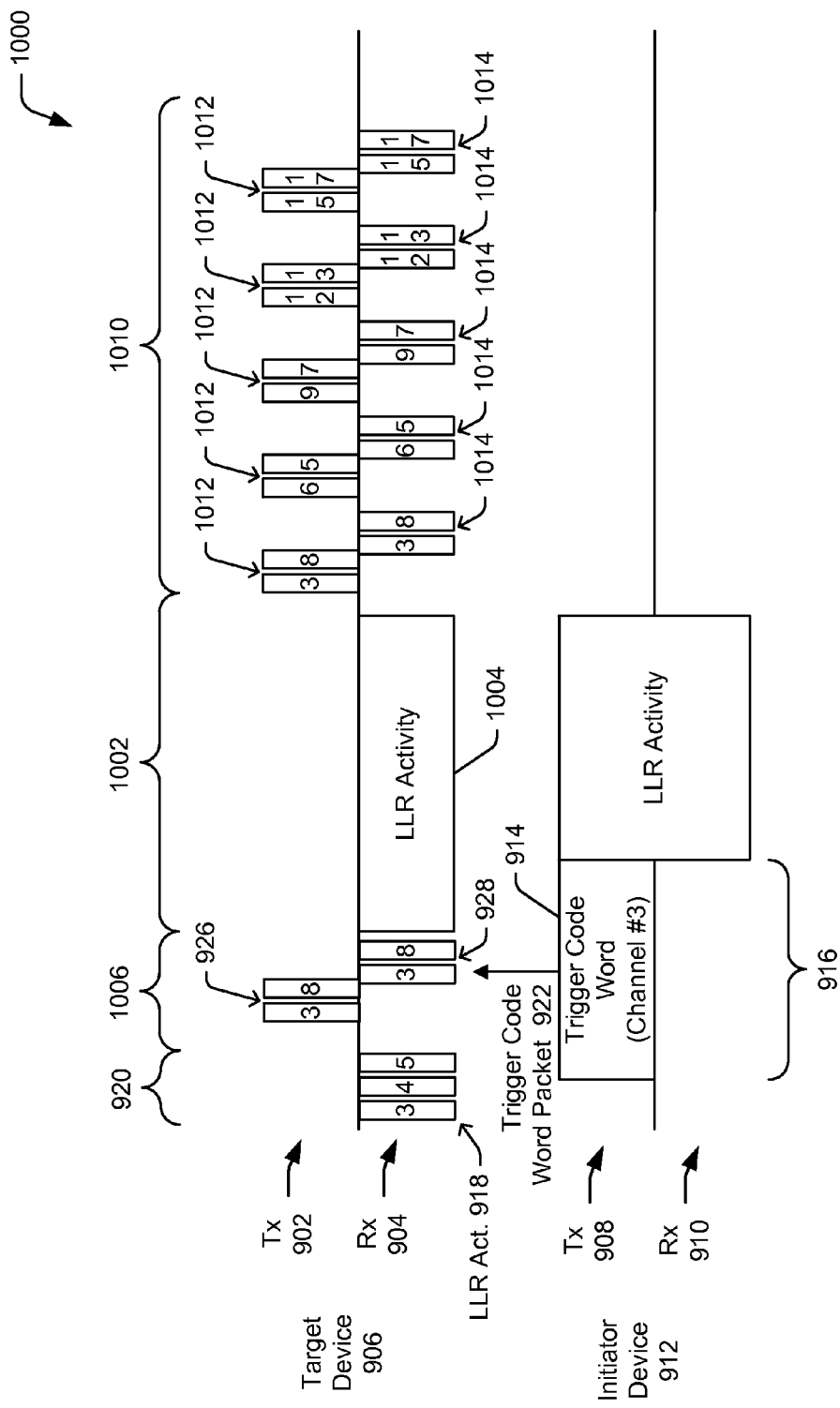

FIG. 9 and FIG. 10 are timing diagrams illustrating wirelessly connecting a plurality of devices for communication in a network in accordance with one or more embodiments. FIG. 9 and FIG. 10 illustrate an example in which a trigger scan of the second technique (e.g., the LLR technique) is shared with a paging response detection of the first technique (e.g., the paging based technique)—a wireless transceiver device listens for packets for the trigger scan and the page scan concurrently, as discussed in more detail below.

FIG. 9 illustrates a timing diagram 900 with example timings of transmitting 902 and receiving 904 of signals for a target device 906 (the target of the wireless connection), and transmitting 908 and receiving 910 of signals for an initiator device 912 (the initiator of the wireless connection). In the example of FIG. 9, the target device 906 is a master device and the initiator device 912 is a slave device.

The initiator device 912 attempts to establish a wireless connection with the target device 906 using the second technique by transmitting packets including a trigger code word on a particular channel for a duration of time, illustrated as trigger code word 914 on channel #3 for a duration of time 916. The target device 906 is listening for the trigger code word (e.g., performing a trigger scan) on different channels (illustrated as channel #3, channel #4, and channel #5) for a particular duration of time 920, illustrated as LLR activity 918. The initiator device 912 transmits packets including the trigger code word during the duration of time 916, but a packet 922 is the first of the packets that is received by the target device 906. Previously transmitted packets including the trigger code word may not have been received by the target device 906 for a variety of different reasons, such as interference from other devices.

The target device 906, in response to not receiving a packet with the trigger code word during the duration of time 920, proceeds to attempt to establish a wireless connection with a wireless transceiver device (the initiator device 912 or another wireless transceiver device) using the first technique during the duration of time 924. During the duration of time 924 the target device 906 acts as a master device for the first technique, transmitting paging packets 926 and listening for paging response packets 928. The paging packets 926 are sent on one or more different channels (which are illustrated as values within the paging packets 926 in FIG. 9) which vary during the duration of time 924 (e.g., one packet on channel #3 and another packet on channel #8, one packet on channel #6 and another packet on channel #7, one packet on channel #9 and another packet on channel #13, and so forth as illustrated in FIG. 9). The target device 906 listens for the paging response packets 928 on the same one or more channels (which are illustrated as values within the paging response packets 928 in FIG. 9) as the paging packets 926 were transmitted (channel #3 and channel #8, channel #6 and channel #7, channel #9 and channel #13, and so forth as illustrated). In the illustrated example of FIG. 9, the target device 906 is listening for paging response packets on the same channel (illustrated as channel #3) as the target device 906 was listening for trigger code word packets during the LLR activity 918.

The target device 906 is listening during the duration of time 924 for paging response packets as well as listening for the trigger code word packets. The target device 906 is thus concurrently listening for paging response packets and trigger code word packets.

The target device 906, in response to receiving the trigger code word 914, proceeds with establishing a wireless connection with the initiator device 912 using the second technique. The packet 922 including the trigger code word 914 interrupts or punctures the first technique, effectively stopping and then re-starting the first technique to allow the target device 906 to establish a wireless connection with the initiator device 912 using the second technique.

FIG. 10 illustrates an example timing diagram 1000 illustrating the interruption of the first technique. The timing diagram 1000 includes example timings of transmitting 902 and receiving 904 of signals for the target device 906, transmitting 908 and receiving 910 of signals for the initiator device 912, the trigger code word 914, the duration of time 916, the LLR activity 918, the duration of time 920, the packet 922, paging packets 926, and paging response packets 928 as discussed with reference to FIG. 9. However, the timing diagram 1000 shows a duration of time 1002 during which establishment of a wireless connection between the target device 906 and the initiator device 912 is completed, illustrated as LLR activity 1004. Various packets can be communicated between the target device 906 and the initiator device 912 during the duration of time 1002. The duration of time 1002 begins in response to the target device 906 receiving the packet 922 including the trigger code word 914 during a time duration 1006 during which the target device 906 is listening for paging response packets and trigger code word packets.

The transmitting paging packets 926 and listening for paging response packets 928 of FIG. 9 was interrupted or punctured by the packet 922 including the trigger code word 914, and thus the first technique is stopped and delayed until after the wireless connection between the target device 906 and the initiator device 912 has been established using the second technique (during the duration of time 1002). After the duration of time 1002 elapses, the target device 906 again proceeds to attempt to establish a wireless connection using the first technique during the duration of time 1010. This attempt to establish the wireless connection using the first technique is the target device 906 transmitting paging packets 1012 and listening for paging response packets 1014. The duration of time 1010 is thus extended relative to the duration of time 924 illustrated in FIG. 9.

As illustrated in FIGS. 9 and 10, the latency when establishing a wireless connection between two wireless transceiver devices (the target device 906 and the initiator device 912) is reduced for the second technique. Rather than having to wait for the duration of time 924 for the paging attempts to elapse before another trigger scan can be performed, the connection established using the second technique interrupts the first technique and thus more quickly establishes a wireless connection between the target device 906 and the initiator device 912.

It should be noted that if the trigger code word 914 were not received by the target device 906 during the duration of time 924, then the target device 906 proceeds to attempt to establish a wireless connection with the initiator device 912 by alternating between attempting to establish a connection using the first technique connection and the second technique.

In the discussions above, reference is made to various different channels. The techniques discussed herein allow the wireless transceiver device to concurrently listen for two different types of packets on the same channel. If a particular type of packet corresponding to the second technique for establishing a wireless connection is received, the second technique is used to establish the wireless connection and the first technique is interrupted.

In one or more embodiments, each channel is a different frequency and wireless communication between two wireless transceiver devices can be performed using one of a particular number (e.g., 79) of different frequencies supported by the wireless communication protocol. The first technique selects a first subset of the different frequencies (e.g., a subset that is 32 of the 79 different frequencies) in any of a variety of different public or proprietary manners (e.g., based on the address of a wireless transceiver device).

The second technique selects a second subset of the different frequencies (e.g., a subset that is 3 of the 79 different frequencies) in any of a variety of different public or proprietary manners (e.g., based on information about channel quality on each frequency). In one or more embodiments, the second subset of frequencies is selected from the first subset of frequencies, increasing the probability that the same frequencies will be used for the first technique and the second technique at any given time.

Figure 11:
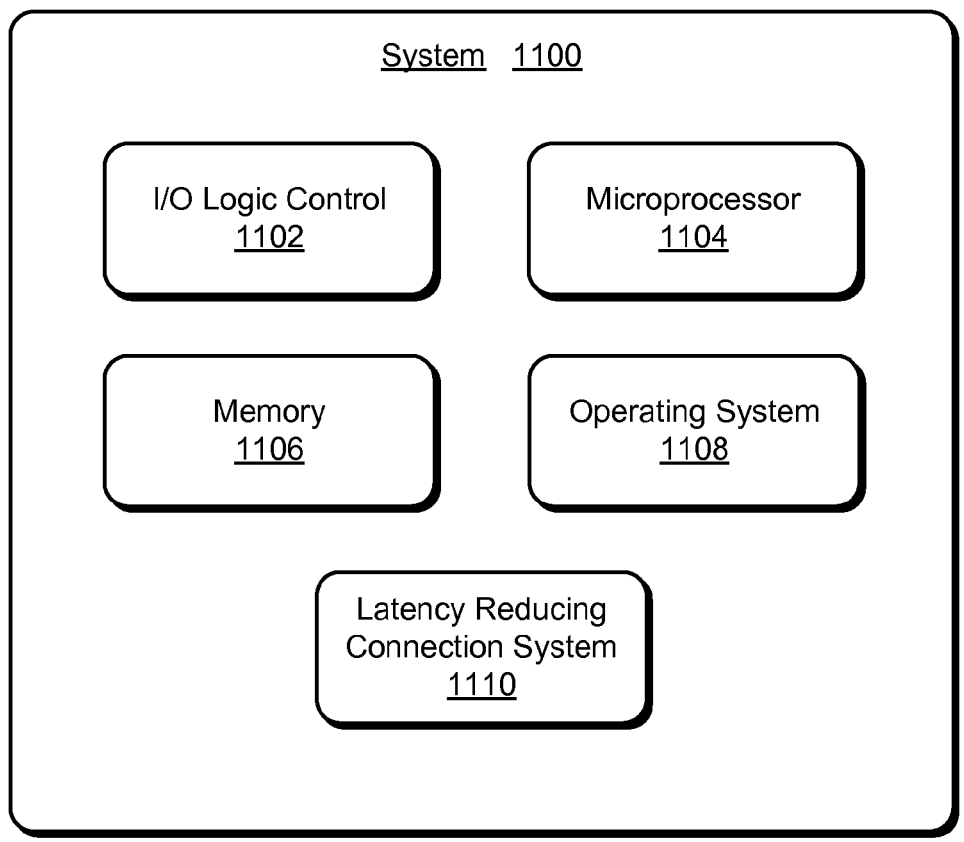
FIG. 11 illustrates an example system that can implement various aspects of the techniques described herein.

FIG. 11 illustrates an example system 1100 that can implement various aspects of the techniques described herein. System 1100 can be implemented in a variety of different devices, such as one or a combination of a media device, computer device, television set-top box, video processing and/or rendering device, Ethernet interface, switch, appliance device, gaming device, electronic device, vehicle, workstation, smart phone, tablet, and/or in any other type of computing device. System 1100 can be implemented as a System-on-Chip (SoC).

System 1100 can include electronic circuitry, a microprocessor, memory, input-output (I/O) logic control, communication interfaces and components, other hardware, firmware, and/or software needed to run a device. System 1100 can also include an integrated data bus (not shown) that couples the various components of the system for data communication between the components. A wireless communication device that includes system 1100 can also be implemented with many combinations of differing components.

In this example, system 1100 includes various components such as an input-output (I/O) logic control 1102 (e.g., to include electronic circuitry) and a microprocessor 1104 (e.g., any of a microcontroller or digital signal processor). System 1100 also includes a memory 1106, which can be any type and/or combination of RAM, low-latency nonvolatile memory (e.g., Flash memory), ROM, one-time programmable memory, and/or other suitable electronic data storage. Alternately or additionally, system 1100 may comprise a memory interface for accessing additional or expandable off-chip memory, such as an external Flash memory module. System 1100 can also include various firmware and/or software, such as an operating system 1108, which can be computer-executable instructions maintained by memory 1106 and executed by microprocessor 1104. System 1100 may also include other various communication interfaces and components, communication components, other hardware, firmware, and/or software, and so forth.

System 1100 also includes a latency reducing connection system 1110 that established wireless connections with other wireless transceiver devices as discussed herein. The latency reducing connection system 1110 can be, for example, a latency reducing connection system 110 or a latency reducing connection system 116 of FIG. 1. The latency reducing connection system 1110 can be implemented in hardware, firmware, software, or combinations thereof.

One or more of the methods or techniques described above can take the form of a computer program product accessible from a computer-usable or computer-readable medium providing program code for use by or in connection with a computer or any instruction execution system. For the purposes of this description, a computer-usable or computer-readable medium is any apparatus that tangibly stores the program for use by or in connection with the instruction execution system, apparatus, or device. The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium can include computer-readable memory devices, which can be any of the devices or mediums discussed above, although excludes signals, signal transmission, and carrier waves.

Although the subject matter has been described in language specific to structural features and/or methodological operations, it is to be understood that the subject matter defined in the appended claims is not necessarily limited to the specific features or operations described above, including orders in which they are performed.

What is claimed is:

1. A method implemented in a first wireless transceiver device, the method comprising:
   simultaneously using each of a first technique and a second technique in attempting to wirelessly connect the first wireless transceiver device with one or more wireless transceiver devices, the first technique comprising a paging based technique usable to establish an initial wireless connection between the first wireless transceiver device and a second wireless transceiver device and the second technique comprising a low latency reconnect technique usable to reestablish a wireless connection between the first wireless transceiver device and a third wireless transceiver device;
   listening, on a particular one of multiple channels, for a first particular type of packet from the second wireless transceiver device to establish the initial wireless connection with the second wireless transceiver device using the first technique;
   listening, on the particular one channel, concurrently with listening for the first particular type of packet, for a second particular type of packet from the third wireless transceiver device to reestablish the wireless connection with the third wireless transceiver device using the second technique; and
   in response to receiving the second particular type of packet, interrupting the first technique and performing the second technique to wirelessly connect the first wireless transceiver device to the third wireless transceiver device.

2. The method of claim 1, further comprising extending a part of the first technique in response to receiving the second particular type of packet.

3. The method of claim 1, the first wireless transceiver device, the second wireless transceiver device, and the third wireless transceiver device comprising three different wireless transceiver devices.

4. The method of claim 1, each of the multiple channels comprising a different frequency of multiple supported frequencies, a first subset of the multiple supported frequencies being selected for use by the first technique, and a subset of the first subset of frequencies being selected for use by the second technique.

5. The method of claim 1, the first particular type of packet comprising a paging packet, and the second particular type of packet comprising a beacon frame packet.

6. The method of claim 1, the first particular type of packet comprising a paging response packet, and the second particular type of packet comprising a beacon frame packet.

7. The method of claim 1, the first particular type of packet comprising a paging packet, and the second particular type of packet comprising a trigger code word packet.

8. The method of claim 1, the first particular type of packet comprising a paging response packet, and the second particular type of packet comprising a trigger code word packet.

9. A first wireless transceiver device comprising:
   a transceiver configured to transmit packets to one or more wireless transceiver devices and receive packets from the one or more wireless transceiver devices; and
   a hardware latency reducing connection system configured to simultaneously use each of a first technique and a second technique in initially attempting to wirelessly connect the first wireless transceiver device with the one or more wireless transceiver devices, the first technique comprising a paging based technique usable to establish an initial wireless connection between the first wireless transceiver device and a second wireless transceiver device and the second technique comprising a low latency reconnect technique usable to reestablish a wireless connection between the first wireless transceiver device and a third wireless transceiver device listen, on a particular one of multiple channels, for a first particular type of packet from the second wireless transceiver device to establish the initial wireless connection with the second wireless transceiver device using the first technique, listen, on the particular one channel, concurrently with listening for the first particular type of packet, for a second particular type of packet from the third wireless transceiver device to reestablish the establish a wireless connection with the third wireless transceiver device using the second technique, and in response to receiving the second particular type of packet, interrupt the first technique and perform the second technique to wirelessly connect the first wireless transceiver device to the third wireless transceiver device.

10. The first wireless transceiver device of claim 9, the hardware latency reducing connection system being further configured to extend a part of the first technique in response to receiving the second particular type of packet.

11. The first wireless transceiver device of claim 9, the first wireless transceiver device, the second wireless transceiver device, and the third wireless transceiver device comprising three different wireless transceiver devices.

12. The first wireless transceiver device of claim 9, each of the multiple channels comprising a different frequency of multiple supported frequencies, a first subset of the multiple supported frequencies being selected for use by the first technique, and a subset of the first subset of frequencies being selected for use by the second technique.

13. The first wireless transceiver device of claim 9, the first particular type of packet comprising a paging packet, and the second particular type of packet comprising a beacon frame packet.

14. The first wireless transceiver device of claim 9, the first particular type of packet comprising a paging response packet, and the second particular type of packet comprising a beacon frame packet.

15. The first wireless transceiver device of claim 9, the first particular type of packet comprising a paging packet, and the second particular type of packet comprising a trigger code word packet.

16. The first wireless transceiver device of claim 9, the first particular type of packet comprising a paging response packet, and the second particular type of packet comprising a trigger code word packet.

17. A computer-readable memory device comprising computer-executable instructions that, when executed, implement a system in a first wireless transceiver device to:
- simultaneously use each of a first technique and a second technique in attempting to wirelessly connect the first wireless transceiver device with one or more wireless transceiver devices, the first technique comprising a paging based technique usable to establish an initial wireless connection between the first wireless transceiver device and a second wireless transceiver device and the second technique comprising a low latency reconnect technique usable to reestablish a wireless connection between the first wireless transceiver device and a third wireless transceiver device;
- listen, on a particular one of multiple channels, for a paging packet or a paging response packet from the second wireless transceiver device to establish the initial wireless connection with the second wireless transceiver device using the first technique;
- listen, on the particular one channel, concurrently with listening for the paging packet or the paging response packet, for a trigger code word packet or a beacon frame packet from the third wireless transceiver device to reestablish the wireless connection with the third wireless transceiver device using the second technique; and
- in response to receiving the trigger code word packet or the beacon frame packet, interrupt the first technique and perform the second technique to wirelessly connect the first wireless transceiver device to the third wireless transceiver device.

18. The method of claim 1, wherein the interrupting comprises puncturing the first technique via a trigger code word packet.

19. The method of claim 1, wherein the interrupting comprises puncturing the first technique via a beacon frame packet.

20. The method of claim 1 further comprising restarting the first technique after establishing the wireless connection between the first wireless device and the third wireless device using the second technique.

* * * * *